United States Patent [19]

Mandava et al.

[11] Patent Number: 5,588,118
[45] Date of Patent: Dec. 24, 1996

[54] SINGLE CHIP DUAL PROCESSOR

[75] Inventors: Babu S. Mandava, Campbell; E. Eugene Weddle, San Jose, both of Calif.

[73] Assignee: Zilog, Inc., Campbell, Calif.

[21] Appl. No.: 363,481

[22] Filed: Dec. 23, 1994

Related U.S. Application Data

[63] Continuation of Ser. No. 748,257, Aug. 21, 1991, abandoned.

[51] Int. Cl.$^6$ .................................................. G06F 15/163
[52] U.S. Cl. .............. 395/200.05; 395/800; 364/DIG. 1
[58] Field of Search ............................... 395/200.05, 800; 364/132

[56] References Cited

U.S. PATENT DOCUMENTS

| | | |
|---|---|---|
| 4,215,399 | 2/1980 | Pavicic et al. . |
| 4,491,907 | 3/1985 | Koeppen et al. . |
| 4,740,882 | 1/1988 | Miller . |
| 4,870,614 | 11/1989 | Quatse . |
| 5,119,499 | 7/1992 | Tonomura et al. . |

OTHER PUBLICATIONS

Majeed, "Dual Processor Automotive Controller," *IEEE Workshop on Automotive Applications of Electronics*, (1988) pp. 39–44.

*Primary Examiner*—William M. Treat
*Attorney, Agent, or Firm*—Majestic, Parsons, Siebert & Hsue

[57] ABSTRACT

A single chip dual processor is implemented combining a microcontroller and digital signal processor. An unitary instruction set is utilized for programming both processors in one source program which is stored in a single external program memory. While compiling the source program, a compiler distinguishes which instructions are to be executed by which processor and designates each instruction to be stored in the appropriate memory space allocated to the processor which is to execute the instruction.

7 Claims, 4 Drawing Sheets

SINGLE CHIP DUAL PROCESSOR

This is a continuation of application Ser. No. 07/748,257, filed Aug. 21, 1991, now abandoned.

BACKGROUND OF THE INVENTION

This invention relates in general to microprocessors and in particular, to a single chip dual processor wherein a microcontroller (μC) is combined with a digital signal processor (DSP).

The advantages of digital signal processing over analog signal conditioning are well known. Among these include improved noise sensitivity, reliability, and design and reconfiguration flexibility. Also, the combination of a μC and DSP to perform certain digital servomechanism tasks is not new. In these systems, the μC can act as master to a DSP slave under a command-and-response type protocol, or the μC and DSP can operate as independent coprocessors.

There are two drawbacks, however, with prior configurations. First, the programmer must separately program each processor. This requires writing two different programs in two different instruction sets, and providing for communication between the programs. The two processors can then interact through a command-and-response type protocol, and share data through shared data memory. Second, separate external program memories store program instructions for each processor. This not only adds component costs, but also complicates the implementation.

When combining a μC and DSP on the same chip, these drawbacks become accentuated. Therefore, it is a primary object of the present invention to provide a dual processor system which combines a μC and DSP on a single chip without these disadvantages.

SUMMARY OF THE INVENTION

This and additional objects are accomplished by the various aspects of the present invention, wherein briefly stated, one aspect of the invention accomplishes these objects by means of a method of commanding multiple processors in a multi-processor system by utilizing an unitary instruction set, a single source code program, a means for distinguishing which instructions are to be executed by which processor, and a memory mapping scheme. The method comprises the steps of coding a source code program by utilizing the unitary instruction set, recognizing which unitary instructions of the source code program are to be executed by which processor, storing the recognized instructions in appropriate memory locations allocated to each processor, translating the stored instructions into appropriate instructions executable by each processor, and finally, executing the translated instructions by the processors.

By providing a unitary instruction set which can program the execution of multiple processors in a single source code program, the programmer's expectations are satisfied since he sees only a single processor, not a series of processors. Also, the unitary instruction set and single source code program serve to both facilitate programming ease and reduce the chances of programming error.

According to another aspect of the present invention, in a single chip multi-processor system designed to execute a program stored in an off-chip (also referred to herein as external) memory device for the purpose of controlling an external physical device in response to an initiating command from a host computer, only one processor in the multi-processor system is connected to the host computer via a system bus and the external program memory via a data/address bus. The connected processor then executes commands intended by the program to be executed by it, and transmits as data to the other processors, commands intended to be executed by the other processors by storing the other processors' commands into designated memory locations.

By utilizing only one processor as the interface to the host computer and the external program memory, the number of required input/output pins for the single chip multi-processor is reduced. In addition, since only one program is required to control the execution of all of the processors, only one external program memory is required. Requiring only one external program memory not only eliminates additional input/output pins, but also additional component costs.

In addition, to facilitate the transfer of program commands from the one processor connected to the host computer and external program memory, to the other processors of a multi-processor system, each of the non-connected processors may have an internal program memory into which the connected processor can store appropriate program instructions as data for each of the respective non-connected processors. Also, each of the non-connected processors may have an internal data memory into which signals from an external physical device may be stored via an analog-to-digital converter and an input measurement line, as well as, interim data calculations and a processed signal command which might be output to the external physical device via a digital-to-analog converter and an output control line.

Additional objects, features and advantages of the various aspects of the present invention will become apparent from the following description of its preferred embodiments, which description should be taken in conjunction with the accompanying drawings.

DETAILED DESCRIPTION OF THE INVENTION

Figure 1:
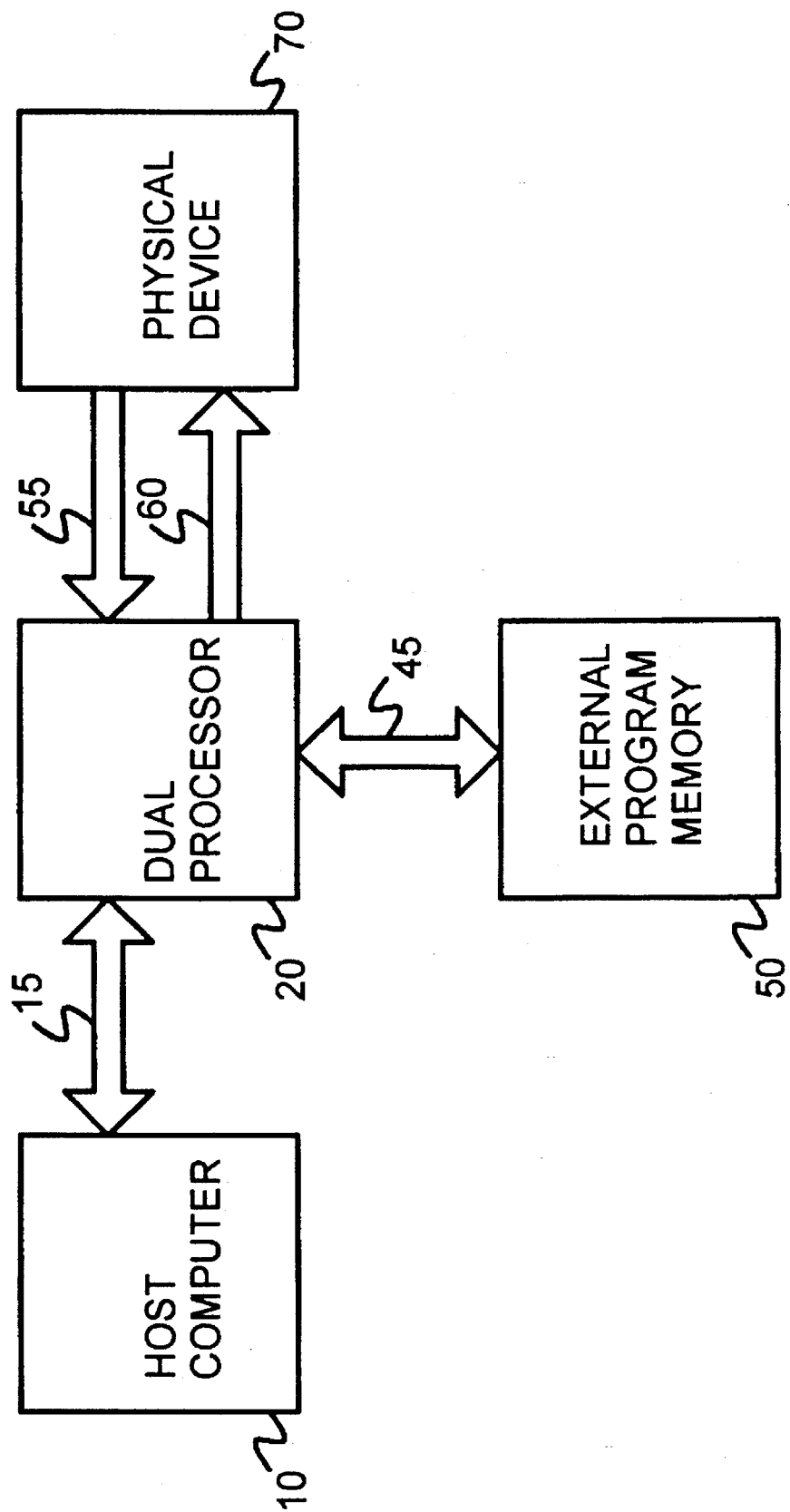
FIG. 1 is a block diagram of a typical servomechanism digital control application, as an example, in which the various aspects of the present invention are utilized.

FIG. 1 is a block diagram of a typical servomechanism digital control application, in which the various aspects of the present invention are utilized. A host computer 10 activates a dual processor 20 to execute a program stored in an external program memory 50 (wherein the terms "off-chip" and "external" are defined herein as referring to a device which is not on the same chip as the dual processor 20) which controls in some manner a physical device 70. The host computer 10 communicates with the dual processor 20 via a system bus 15. The dual processor 20 then communicates with the external program memory 50 via a data/address bus 45 and with the physical device 70 via an input measurement line 55 and an output control line 60.

Figure 2:
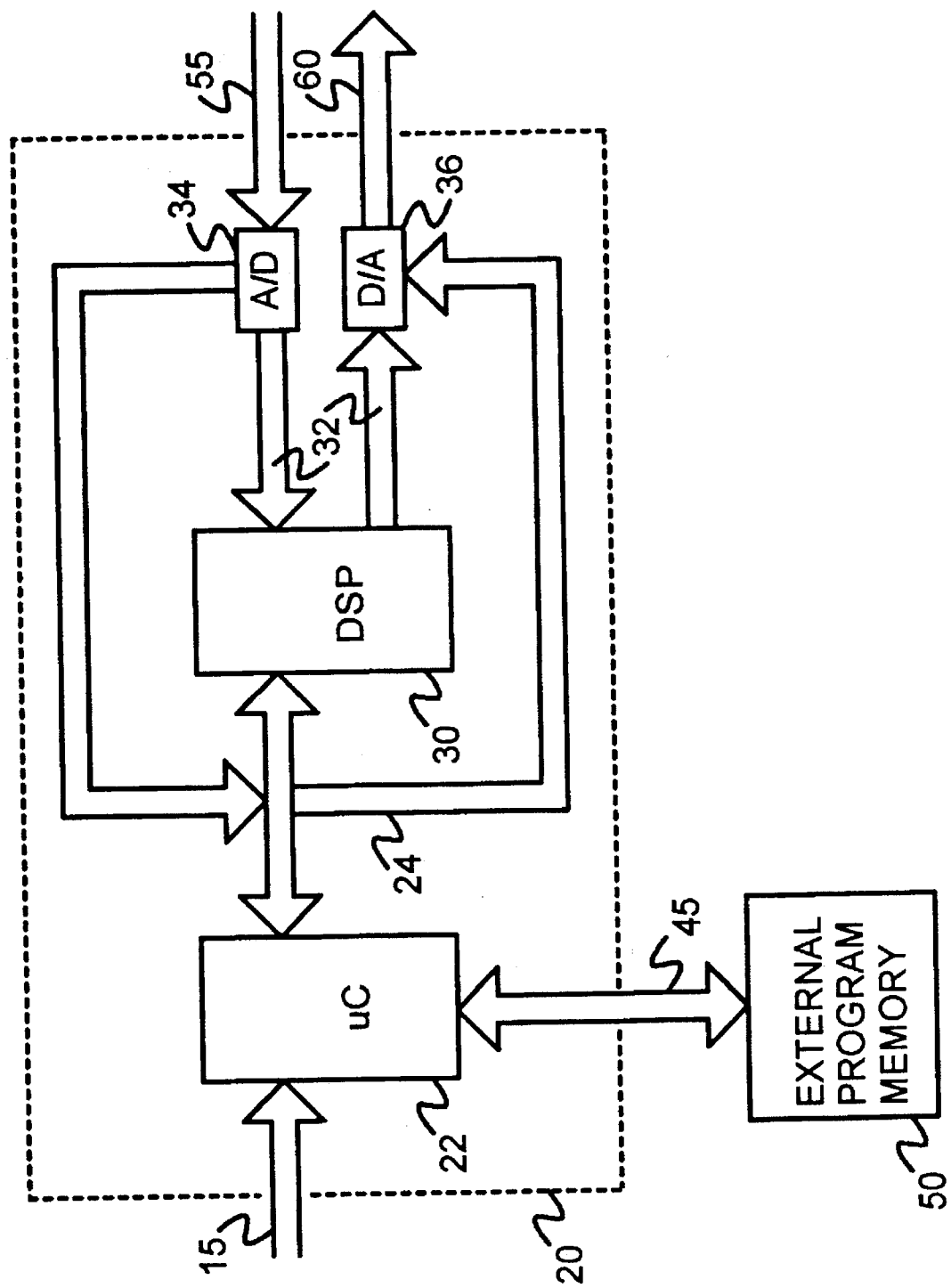
FIG. 2 is a block diagram of a representative dual processor system, illustrating aspects of the present invention.

FIG. 2 is a simplified block diagram of the dual processor 20 which illustrates aspects of the present invention. Both the system bus 15 and the data/address bus 45 only interface with the µC 22—neither bus directly interfaces with the DSP 30. Thus, it is necessary for the µC 22 to pass program code from the external program memory 50, which are intended to be executed by the DSP 30, to the DSP 30 via an internal bus 24. The measurement line 55 and output control line 60, however, are not required to directly interface with the µC 22. The measurement line 55 can directly interface with the DSP 30 through typical means such as an analog-to-digital converter 34 via an internal bus 32, and the output control line 60 can be driven by the DSP 30 through typical means such as an digital-to-analog converter 36, also via the internal bus 32. By allowing the DSP 30 to access, process and control data from and to the physical device 70 directly, without intervention from the µC 22, the resulting measurement and control process is not only faster, but the µC 22 is also freed up to perform other tasks in parallel with the DSP 30.

Figure 3:
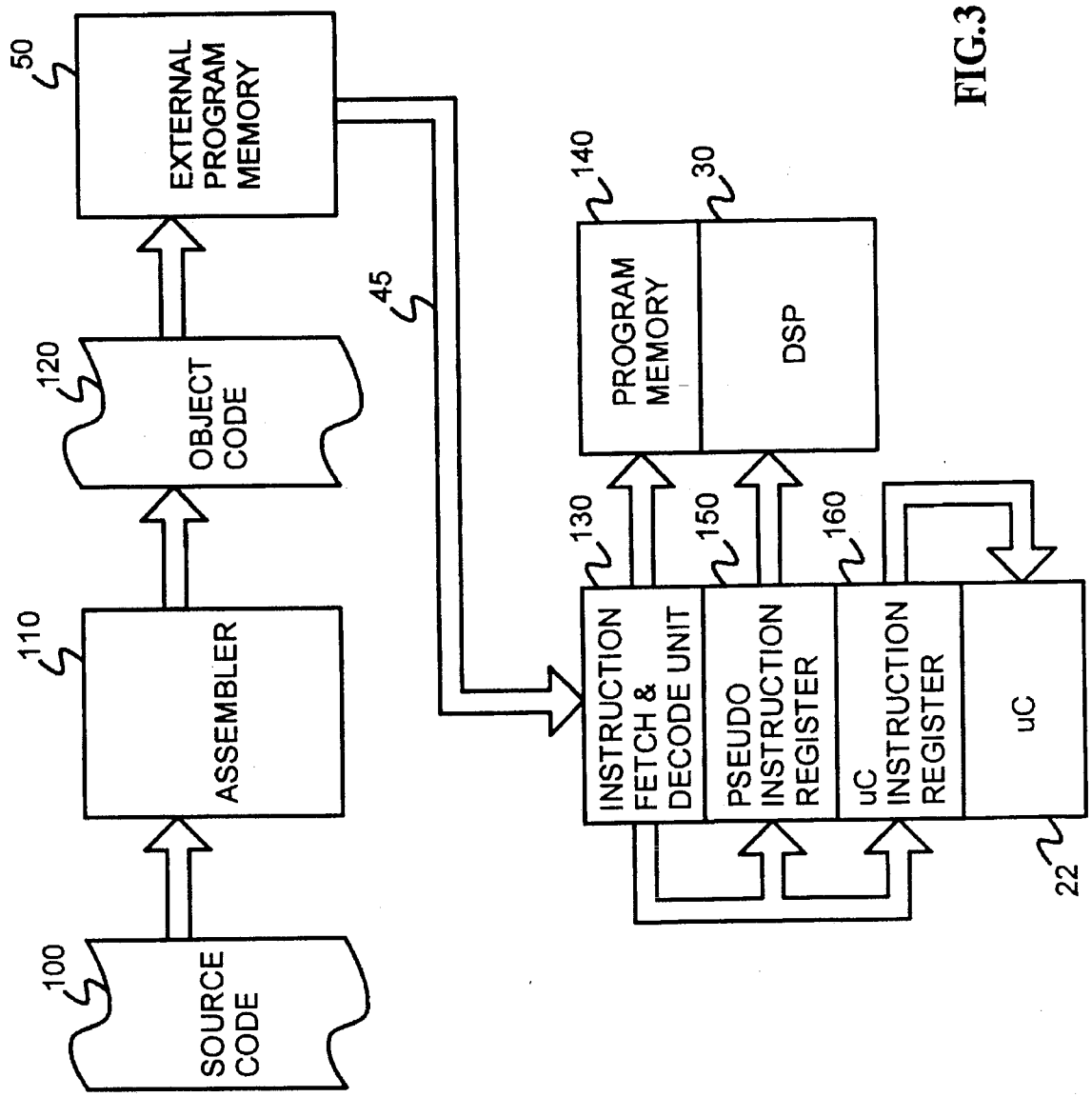
FIG. 3 is a flow diagram illustrating how the program code instructions are routed to the μC or DSP for execution.

FIG. 3 is a flow diagram illustrating how program source code instructions 100 are routed to the µC 22 or the DSP 30 for execution. First, when an assembler 110 compiles the source code 100, it recognizes which instructions are for the µC 22 and which are for the DSP 30. A simple means for the assembler to do this is to have separate sets of unitary instructions that either only the µC 22 or the DSP 30 will execute. Thus, by recognizing which set of unitary instructions a given instruction belongs to, the assembler 110 will know which processor is to execute that instruction.

After the assembler 110 determines which processor is to execute a given instruction, the assembler 110 then structures the resulting object code 120 such that the µC 22 commands are translated into their appropriate µC 22 opcode, and the DSP 30 commands are translated into µC 22 load data commands with the DSP 30 commands treated as data. The object code 120 is then stored in the external program memory 50.

Within the µC 22 is a number of registers and related logic including an instruction fetch and decode unit 130 (FIG. 3), instruction mapping logic 180 (FIG. 4), a pseudo instruction register 150 (FIG. 4), a pseudo program counter 170 (FIG. 4), and a µC instruction register 160 (FIG. 3). Within the DSP 30 are several memory areas including a program memory 140 (FIG. 3).

When a program is executed, the instructions are read from the external program memory 50 via the data/address bus 45 into the instruction fetch and decode unit 130 of the µC 22. If the instruction is in µC 22 opcode, then it is stored in the instruction register 160 of the µC 22 for execution by the µC 22. However, if the instruction is a µC 22 load data command, then the data storage location depends upon whether the programmer specified that the instruction should be stored in the DSP 30 program memory 140, or by default, the pseudo instruction register 150 of the µC 22. In either event, the DSP 30 will look in either location for its program instructions.

Figure 4:
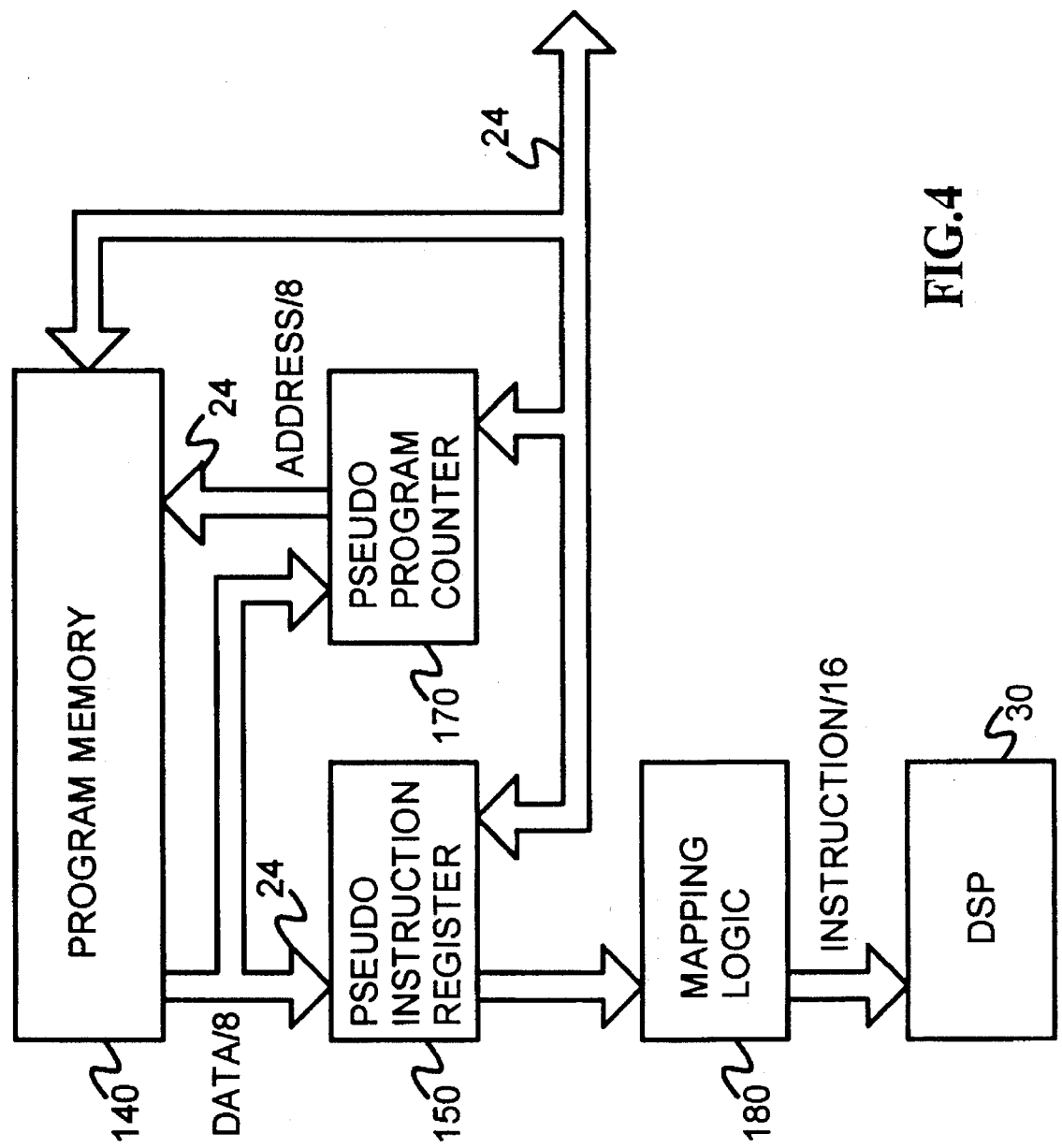
FIG. 4 is a block diagram further elaborating upon the execution of the DSP commands from either the program memory or the pseudo instruction register.

FIG. 4 is a block diagram further elaborating upon the execution of DSP 30 commands from either the program memory 140 or the pseudo instruction register 150. When the programmer does not specify the program memory 140 as the program storage location, each DSP 30 instruction is stored in the pseudo instruction register 150 via the internal bus 24, then mapped from the unitary instruction command mneumonic to the DSP 30 instruction command mneumonic via the mapping logic 180, and then finally executed in the DSP 30. The instruction fetch and decode unit 130 would then receive the next program command from the external program memory 50, and if it is another DSP 30 instruction, the process would be repeated. Thus, in this mode, the µC 22 would intervene after each DSP 30 program instruction was executed.

On the other hand, if several DSP 30 program instructions are desired to be executed without intervention by the µC 22, then the programmer can designate each of those instructions to be stored in the program memory 140. This can be done by a program directive to dump the following number of commands in program memory 140 starting with the directive instruction.

After filling program memory 140 with instructions to be executed, initializing the pseudo instruction register 150 with the first instruction to be executed, and the pseudo program counter 170 with the location of the next instruction to be executed, all of the DSP 30 program instructions stored in the program memory 140 are then executed under control of the pseudo program counter 170 before the instruction fetch and decode unit 130 receives another instruction from the external program memory 50. Thus, in this mode, the µC 22 would only intervene after all the instructions stored in the program memory 140 have been executed, and meanwhile, would be free to execute in parallel other tasks.

An 8-bit Zilog Z8® microcontroller is representative of the µC 22. Likewise, a CD2400 (clarkspur) 16-bit digital signal processor is representative of the DSP 30. For additional µC and DSP details, public information on these two devices can be referenced.

Although the various aspects of the present invention have been described with respect to a preferred embodiment, it will be understood that the invention is entitled to full protection within the full scope of the appended claims.

What is claimed is:

1. A method of providing, from a single computer program, program instructions to be executed by a first processor to said first processor and program instructions to be executed by a second processor to said second processor, comprising:

reading a program instruction from said single computer program; and storing, if said program instruction is an opcode instruction of said first processor, said program instruction into an instruction register of said first processor, and storing, if said program instruction is a load data instruction of said first processor, data associated with said load data instruction into a pseudo instruction register accessible to said second processor, wherein said data loaded into said pseudo instruction register corresponds to a program instruction to be executed by said second processor.

2. The method as recited in claim 1, further comprising after said storing step:

executing, by said first processor, said opcode instructions stored in said instruction register of said first processor;

mapping said data stored in said pseudo instruction register into corresponding program instructions of said second processor; and executing, by said second processor, said mapped program instructions.

3. A method of providing, from a single computer program, program instructions to be executed by a first processor to said first processor and program instructions to be executed by a second processor to said second processor, comprising:

reading program instructions from said single computer program; and storing individual ones of said program instructions which are opcode instructions of said first processor into an instruction register of said first processor, and storing data corresponding to individual ones of said program instructions which are load data instructions of said first processor into a program memory accessible to said second processor, wherein said data loaded into said program memory correspond to program instructions to be executed by said second processor.

4. The method as recited in claim 3, further comprising:

loading a pseudo program counter accessible to said second processor with a location in said program memory corresponding to a next instruction to be executed by said second processor.

5. The method as recited in claim 3, further comprising after said storing step:

sequentially executing, by said first processor, said opcode instructions individually stored in said instruction register of said first processor;

individually mapping said data stored in said program memory into corresponding program instructions of said second processor; and sequentially executing, by said second processor, said individually mapped program instructions.

6. A method of utilizing a computer program including program instructions to be executed by a first processor and instructions corresponding to program instructions to be executed by a second processor, comprising:

generating said computer program such that said program instructions to be executed by said first processor are assembled as opcode instructions of said first processor, and said instructions corresponding to program instructions for said second processor are assembled as data along with load data instructions of said first processor; and storing said computer program in a memory accessible to said first processor.

7. The method as recited in claim 6, further comprising:

reading a program instruction from said computer program; and storing, if said program instruction is an opcode instruction of said first processor, said program instruction into an instruction register of said first processor, and storing, if said program instruction is a load data instruction of said first processor, data associated with said load data instruction into a pseudo instruction register accessible to said second processor.

* * * * *